Feb. 28, 1961  A. E. GREGOIRE  2,973,217
AUTOMOBILE TRUNK LID HOLDER KIT
Filed July 23, 1959
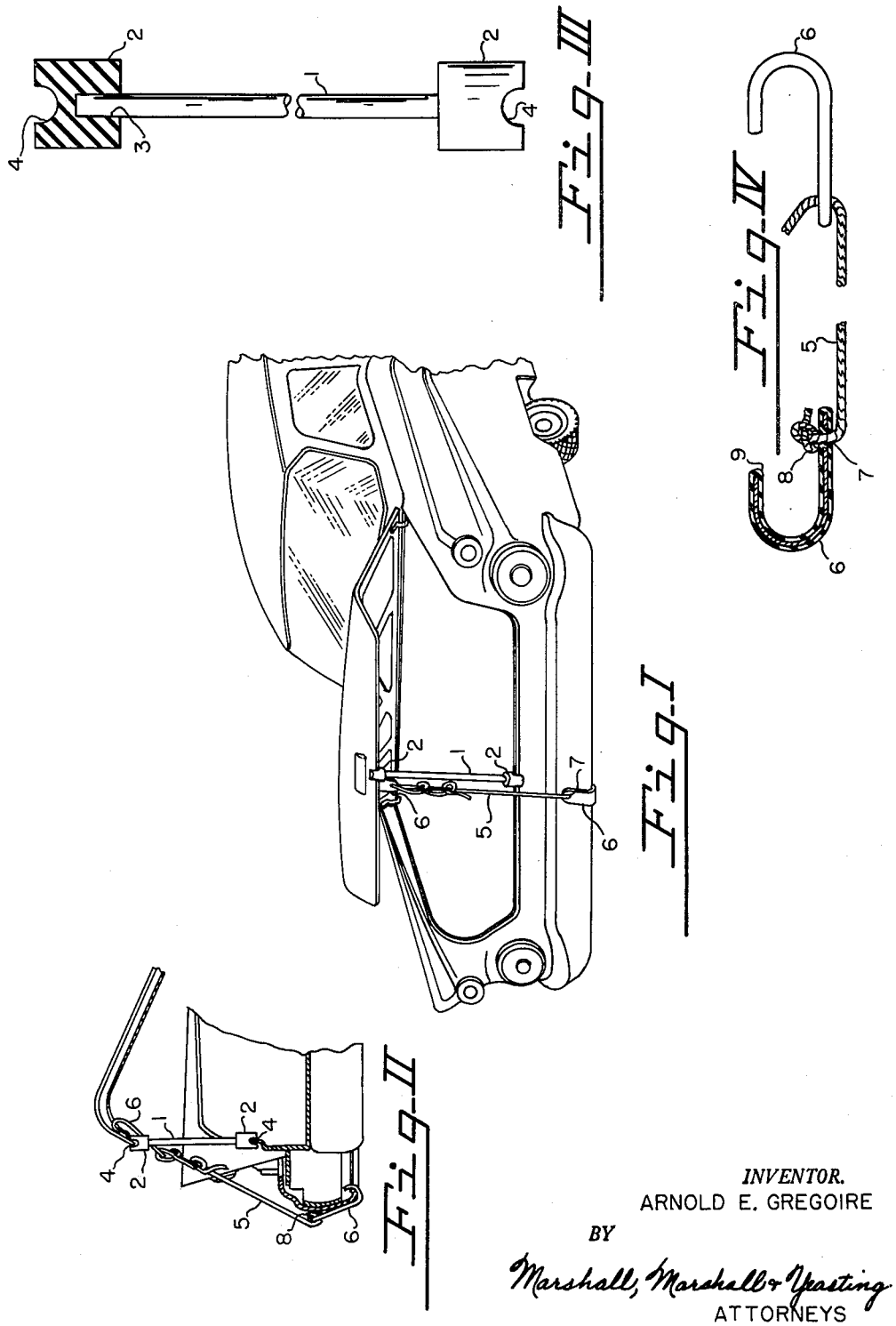
INVENTOR.
ARNOLD E. GREGOIRE
BY
Marshall, Marshall & Yeasting
ATTORNEYS

United States Patent Office 2,973,217
Patented Feb. 28, 1961

2,973,217

AUTOMOBILE TRUNK LID HOLDER KIT

Arnold E. Gregoire, 7600 Secor Road, Rte. 1,
Lambertville, Mich.

Filed July 23, 1959, Ser. No. 829,017

2 Claims. (Cl. 292—288)

This invention relates to devices for holding automobile trunk lids in open, or partially open, positions. It often is desirable to utilize automobile trunks for transporting articles, such for example as lawn mowers, which because of their sizes and shapes prevent the lids of trunks from being closed and fastened shut while such articles are contained in the trunks. If the trunk lids are left open and unsecured, damage to the lids, their hinges, and to the adjacent parts of the automobile body is likely to result when the auto is driven over bumps or around sharp curves, or is suddenly stopped.

It is an object of this invention to provide a kit which can be packed into a small space and which consists of elements that can be readily assembled and adjusted in position to hold the lid of an automobile open and in position to permit part of an article to protrude from within the trunk.

An important secondary object of the invention is to provide a kit which, because of its simplicity and because it can be displayed and sold unassembled, is so low in manufacturing cost that it can be merchandised to the general public in variety stores and by mail.

It is a further object of the invention to provide a kit which when so assembled with an automobile trunk as to hold the trunk lid open will prevent rattling or bouncing of the lid and thus avoid the liability of damage during transportation over rough terrain or by erratic movements of the automobile.

Another object of the invention is to provide automobile trunk lid holding means which can be applied to variously constructed trunks and lids independently of their locking mechanisms, and which therefore cannot damage the locking mechanisms.

And still another object is to provide a device for holding automobile trunk lids firmly in elevated positions, which device is so designed that it will not mar the finish of parts with which it engages.

Other objects and many advantages of the invention will become apparent upon perusal of the following description as illustrated by the accompanying drawings, in which:

Fig. I is a view in perspective of the rear end of an automobile showing the trunk lid as held in open position by the application of elements of a kit of my invention;

Fig. II is an elevational view showing the manner in which the elements of the kit are applied, some of the adjacent parts of the automobile being shown in section;

Fig. III is an elevational view on an enlarged scale showing certain elements of the kit assembled to form a strut which constitutes part of the lid holding device, the center portion of the strut being broken out to foreshorten the figure;

Fig. IV is a fragmentary view, also on an enlarged scale, partly in section showing hook and line elements of the kit of my invention.

These drawings and the following description illustrate and describe a preferred form of my invention but they are not intended to limit its scope.

The device of my invention when it is assembled in operative relation to the lid of an automobile trunk consists essentially of a strut portion and a tension portion which cooperate to hold the trunk lid tightly in elevated position and to secure it against rattling, bouncing and the effects of sudden changes in speed or direction of motion.

The strut portion consists of a shaft 1 and a pair of grooved terminal fittings 2. The shaft 1 may be made of metal rod or pipe, or it may be made of wood, e.g., of ¾" round handle stock or dowelling. Wood shafts are particularly suitable for the purpose because of their low cost, lightness and the ease with which they may be cut by the user to proper length for use with any make and model of automobile. The terminal fittings 2 preferably are made of relatively soft material such as rubber, which can be molded or otherwise formed. They may be round or square in cross section. Each fitting has a socket 3 that snugly receives an end of the shaft 1. Each fitting also has a groove or notch 4 adapted to receive the edge of a trunk lid or the edge of the rear wall of a trunk. Where the shaft 1 is of substantial cross sectional area the fittings 2 may be omitted and the grooves or notches may be formed directly in the ends of the shaft.

The tension portion of the lid holding device comprises a flexible elongated element, such as an elastic nylon rope 5, and a pair of hooks 6. The hooks 6 have eyes 7 through which the rope or equivalent element 5 may be threaded. When the tension portion is assembled the tips of the rope may be knotted as indicated by the reference numeral 8 or otherwise enlarged to prevent them from accidentally slipping out of the eyes.

The hooks 6 are preferably covered by a thick coating or sheath 9 of soft material, e.g., rubber, to prevent them from marring the finish of the automobile parts with which they may come into contact. The hooks are shown as made of flat metal with holes constituting the eyes 7 but they may be formed of metal rod or in any other desired manner.

The kit may be carried in the trunk of an automobile with the strut portion assembled, as shown in Fig. III, and the tension portion assembled as shown in Fig. IV. When the kit is to be used the trunk lid may be lifted and the strut portion inserted between the rear edge of the lid and the upper edge of the rear wall of the trunk, as shown in Fig. I, the edges of the lid and the trunk wall being received in the grooves or notches 4 as shown in Fig. II. One of the hooks 6 then is hooked over the trunk lid handle or into an opening in the trunk lid lining or to any other convenient edge or protuberance on the lid. Occasionally the lid and handle construction is such that a loop in the rope itself may be drawn over the shank of the trung handle. In such cases both hooks sometimes may be hooked over the bumper or some other automobile part with a down-turned edge.

In any case the length of rope, or other flexible element, extending from the lid to the bumper, or other fixed part of the body, is drawn taut by pulling the rope end further through the eye of one of the hooks and half hitching or otherwise tying it around the tautened length. For purposes of illustration loose half hitches are shown in Figs. I and II of the drawings but the half hitches should, of course, be pulled tight.

In some cases, as where a bight of the rope takes around the shank of the trunk handle both hooks may be hooked to the bumper. In such cases, the rope may be tightened and fastened in substantially the same way as above described.

The kit may be supplied with extra shaft and terminal fitting elements to make two strut portions which can be placed between the center point and the sides of the trunk lid for greater stability. Generally, however, a single centrally placed strut portion is sufficient.

A plurality of shafts of different lengths may be included in the kit so that the user can select a shaft most suitable for use for his automobile or most suitable for use in supporting the trunk lid in position to accommodate any particular article. While a selection of shafts may be desirable if the shafts are made of metal, wooden shafts are so easily cut to length and so inexpensive to replace or supplement with longer pieces that original equipment of spare wooden shafts seldom will be called for.

The kit as above described may be furnished unassembled, with simple directions for assembly and use, at a cost which makes the kit an attractive item of merchandise. I am aware that heavy expensive adjustable engine hood and trunk lid supports have been designed for use in automobile service stations but these supports do not supply the need of individual automobile owners for a low cost, light weight, easily manipulated, strong, silent and safe trunk lid holder to facilitate transportation in automobile trunks of outsize articles.

This specific device hereinabove described and illustrated in the accompanying drawings is to be regarded as exemplary only and the invention disclosed herein includes variations within the spirit and scope of the subjoined claims.

I claim:
1. An automobile trunk lid holder kit comprising cooperative strut and tension portions, said strut portion consisting of a rigid shaft and a pair of terminal fittings, said fittings each having a socket adapted to snugly receive an end of said shaft, each fitting having a resiliently expandable end notch adapted to receive automobile trunk lid or wall edges of various shapes and having relatively soft surfaces to avoid marring finishes of automobile parts engaged by said notches, said tension portion consisting of a rope element and a pair of hooks having eyes through which ends of said rope element are threaded, said hooks being coated with rubber-like material to avoid marring the finish of automobile parts engaged by said hooks, said strut portion being adapted to be interposed between an automobile trunk lid and an edge of an automobile trunk wall to prevent such lid from closing, and said tension portion being adapted to have its hooks engaged with protuberances or edges of said automobile trunk lid and a fixed part of such automobile and to have a length of its rope element drawn taut and secured between such lid and a fixed part of such automobile, whereby said shaft acting in compression and said rope element acting in tension, mutually cooperate to hold such open lid firmly against bouncing and damage during transportation over rough terrain or during erratic movements.

2. An automobile trunk lid holder kit comprising cooperative strut and tension portions, said strut portion consisting of a rigid shaft and a pair of identical rubber-like terminal fittings, said fittings each having a socket adapted to snugly receive an end of said shaft, each fitting having a resiliently expandable end notch adapted to receive automobile trunk lid or wall edges of various shapes and having relatively soft surfaces to avoid marring finishes of automobile parts engaged by said notches, said tension portion consisting of a rope element and a pair of hooks having eyes through which ends of said rope element are threaded, said hooks being coated with rubber-like material to avoid marring the finish of automobile parts engaged by said hooks, said strut portion being adapted to be interposed between an automobile trunk lid and an edge of an automobile trunk wall to prevent such lid from closing and said tension portion being adapted to have its hooks engaged with protuberances or edges of said automobile trunk lid and a fixed part of such automobile and to have a length of its rope element drawn taut and secured between such lid and a fixed part of such automobile, whereby said shaft acting in compression and said rope element acting in tension, mutually cooperate to hold such open lid firmly against bouncing and damage during transportation over rough terrain or during erratic movements.

References Cited in the file of this patent
UNITED STATES PATENTS

| 598,405 | Williams | Feb. 1, 1898 |
| 2,618,497 | Gardels | Nov. 18, 1952 |
| 2,908,522 | Glave | Oct. 13, 1959 |